United States Patent [19]

D'Alterio

[11] Patent Number: 4,765,632
[45] Date of Patent: Aug. 23, 1988

[54] LUBRICATED ROTARY SHAFT SEAL

[76] Inventor: Joseph C. D'Alterio, 64 Sugar Maple La., Glen Cove, N.Y. 11542

[21] Appl. No.: 124,018

[22] Filed: Nov. 23, 1987

[51] Int. Cl.⁴ .............................................. F16J 15/38
[52] U.S. Cl. .............................. 277/81 R; 277/72 R; 277/79; 277/93 SD
[58] Field of Search ............... 277/81 R, 82, 92, 93 R, 277/93 SD, 95, 70, 71, 72 R, 72 FM, 79

[56] References Cited

U.S. PATENT DOCUMENTS

| 1,544,609 | 7/1925 | Somes | 277/81 R X |
| 2,966,859 | 1/1961 | Salter et al. | 277/93 R X |
| 3,765,689 | 10/1973 | Adams | 277/81 R X |

FOREIGN PATENT DOCUMENTS 762950 12/1956 United Kingdom ............ 277/93 R

Primary Examiner—Robert S. Ward
Attorney, Agent, or Firm—Paul W. Garbo

[57] ABSTRACT

A lubricated rotary seal mounted between a shoulder of a rotary shaft and a face plate through which the shaft end extends has a ring-shaped body that fits on the shaft end and partially overlaps the shaft shoulder. A porous bearing washer on the face of the seal spans a circular channel in the body which contains oil-soaked wadding. A cylindrical recess in the seal body fits over the shaft shoulder and houses several compression springs which press the seal with its lubricated bearing washer in contact with the face plate. Debris formed by erosion of the bearing washer can be accumulated in the seal body and periodically removed. Oil can be periodically injected into the wadding.

12 Claims, 2 Drawing Sheets

LUBRICATED ROTARY SHAFT SEAL

BACKGROUND OF THE INVENTION

This invention relates to a lubricated rotary seal disposed between a shoulder of a rotary shaft and a face plate through which the shaft end extends. More particularly, the invention provides a self-lubricating seal that has storage space for a quantity of oil which will permit proper operation of the seal over a long period of time before the replenishment of oil becomes necessary.

Numerous rotary seals for rotating shafts have been proposed and several types are used in various applications. For example, U.S. Pat. No. 2,910,329 to Runton discloses a sealing ring and thrust bearing on the shaft of a turbine rotor. Runton's seal is held between shoulder 16 of his shaft and wall 12 through which the shaft extends. The seal has sealing ring 25 which is held in contact with wall 12 by springs 21. The stated feature of Runton's invention is a sealing ring comprising woven plies embedded in thermosetting resin. The sealing ring allegedly has low-friction surface characteristics so that lubricating oil is not used.

The seal of Runton may be used in some specific applications but is not broadly applicable particularly in cases where the seal may be exposed to liquid and dirt particles or where the escape of debris resulting from the wear and erosion of the seal against a face plate might contaminate a product such as pastry dough that is rolled into a sheet between a pair of rotating shafts, each having seals at its opposite shoulders.

A principal object of this invention is to provide a lubricated rotary seal with an oil-permeable or porous bearing washer that can function for a long period of time without replenishing its oil supply.

A further object is to shield the oil-porous bearing washer from direct exposure to liquid that may contact the exterior of the rotary seal.

Another important object is to prevent or minimize the escape from the rotary seal of oily debris formed by the erosion of the face of the bearing washer.

Other features and advantages of the invention will be apparent from the description which follows.

SUMMARY OF THE INVENTION

In accordance with this invention, a lubricated rotary seal for placement between a shoulder of a rotary shaft and a face plate through which the shaft end extends comprises a ring-shaped body to fit the shaft end, a cylindrical recess in one end of the body to overlap the shaft shoulder, a circular groove in the cylindrical surface of the recess and an O-ring in the groove to provide a seal between the body and the shaft, at least three equally-spaced circular sockets in the base of the recess and a compression spring in each socket, a circular channel in the opposite end of the body and a lubricant-porous bearing washer fastened across the channel to confine oil therein. The O-ring prevents or minimizes liquid and dust penetration between the cylindrical surface of the shaft and the overlapping portion of the rotary seal while the springs maintain the rotary seal with its oil-porous bearing washer in close contact with the face plate through which the shaft end extends.

Frequently, the circular channel contains oil-soaked wadding which releases oil to the porous bearing washer more slowly than when oil alone is in the channel. Preferably, the rotary seal has a radial hole through its body which communicates with the circular channel so that oil can be injected from time to time when needed. Desirably, the radial hole is tapped to receive a set screw to prevent the outward flow of oil after it has been injected. In cases where the rotary seal may be exposed to water or other liquid, a plastic washer may surround the porous bearing washer so that the liquid does not directly contact the bearing washer. The base of the circular channel may have a groove or several indentations to act as a reservoir for the lubricating oil, particularly when the channel is filled with wadding.

An essential component of the seal of this invention is the lubricant-porous bearing washer which rotates against the face plate. Such porous bearing material is well known. U.S. Pat. No. 3,109,684 to Tupper shows a sintered sleeve type bearing 20 which is permeable to oil. A lubricant holding reservoir 25 containing felt pad 33 surrounds and contacts the outer surface of bearing 20 to meter oil thereto. The Boston Gear Division of Incom International Inc. sells Bost-Bronz (Reg. TM) oil-impregnated porous bronze bearing material made of metal powders by the powder metalurgy process. Another supplier is Eagle Picher Bearings which offers Oilite (Reg. TM) powdered metal bearings in a variety of metal compositions and oil porosities. Both Bost-Bronz and Oilite bronze are very desirable materials for the bearing washer of the novel rotary shaft seal.

While the ring-shaped body of the rotary seal is often made of stainless steel or aluminum, many alloys and even other materials such as thermoset plastics may be used depending on the environment in which the seal is to operate. The plastic washer is in most cases made of nylon or Delrin (product of DuPont). Other suitable plastics include fluorinated ethylenepropylene polymer and graphite-filled plastics. The wadding in the seal may be cotton, synthetic fibrous material or a sponge-like product. The O-ring is made of natural and/or synthetic rubber.

BRIEF DESCRIPTION OF THE DRAWINGS

To facilitate the further description and understanding of the invention, reference will be made to the accompanying drawings in which.

DESCRIPTION OF PREFERRED EMBODIMENTS

Figure 1:
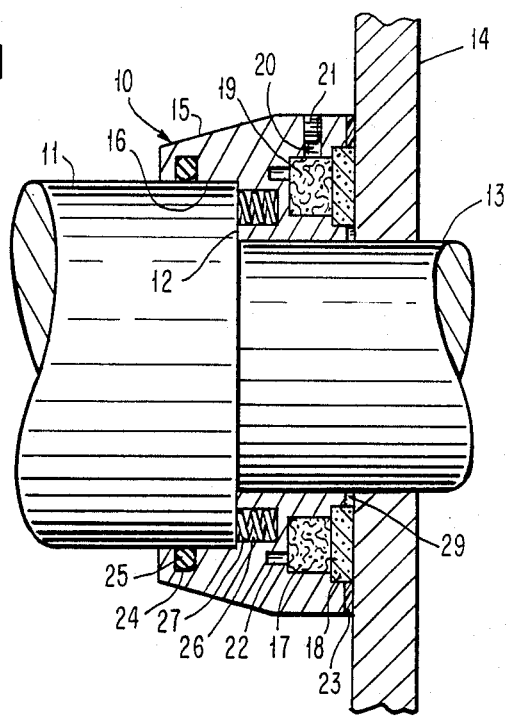
FIG. 1 is a diametrical section of a preferred embodiment of the rotary seal shown mounted on the end portion of a rotary shaft where it passes through a face plate.

FIG. 1 is a half section of lubricated seal 10 mounted on shaft 11 at its shoulder 12 where the diameter of shaft 11 is reduced to provide a bearing end or axle 13 which extends through an opening in face plate 14 to bearings and drive means not shown. Rotary seal 10 has a ring-shaped body 15 with a central bore to slip on axle 13 and with a concentric cylindrical recess 16 to slip over shaft 11 at its shoulder 12. The opposite end of body 15 has a concentric circular channel 17 and a porous bearing washer 18 fastened across channel 17 to confine oil therein.

Usually, wadding 19 is placed in channel 17 before bearing washer 18 is attached to cover channel 17. A radial hole 20 extends from the cylindrical surface of body 15 to channel 17 so that the supply of oil in channel 17 can be easily replenished when needed. Hole 20 is tapped to receive set screw 21 which prevents oil from flowing out of hole 20. At the base of channel 17 is a smaller channel or groove 22 that acts as an oil reservoir and therefore prolongs the operating period before it becomes again necessary to inject oil through hole 20. Bearing washer 18 is surrounded by plastic washer 23 which shields washer 18 from direct contact with water or other liquid that might splash on face plate 14 and rotary seal 10.

The cylindrical surface of recess 16 in rotary seal 10 has groove 24 in which is fitted O-ring 25 to inhibit the migration of liquid and dirt between shaft 11 and the overlapping part of seal 10. The base of recess 16 has been drilled to provide several, usually 3 to 6, sockets 26 equally spaced from one another. A compression spring 27 is placed in each socket 26. Springs 27 serve to urge seal 10 with its lubricated bearing washer 18 in good contact with face plate 14.

Figure 2:
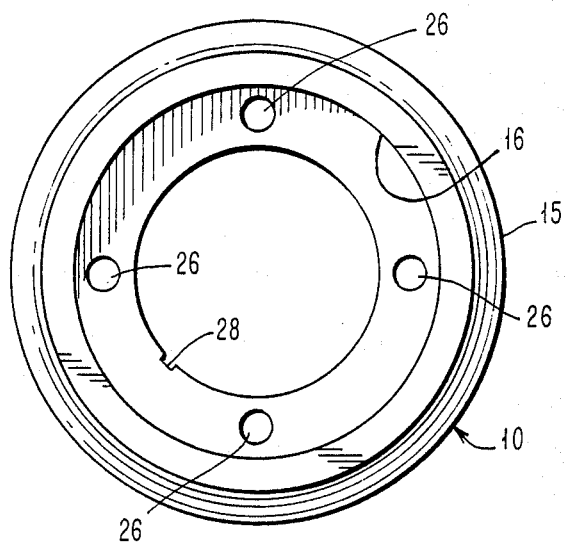
FIG. 2 is a left end view of only the rotary seal of FIG. 1.
Figure 3:
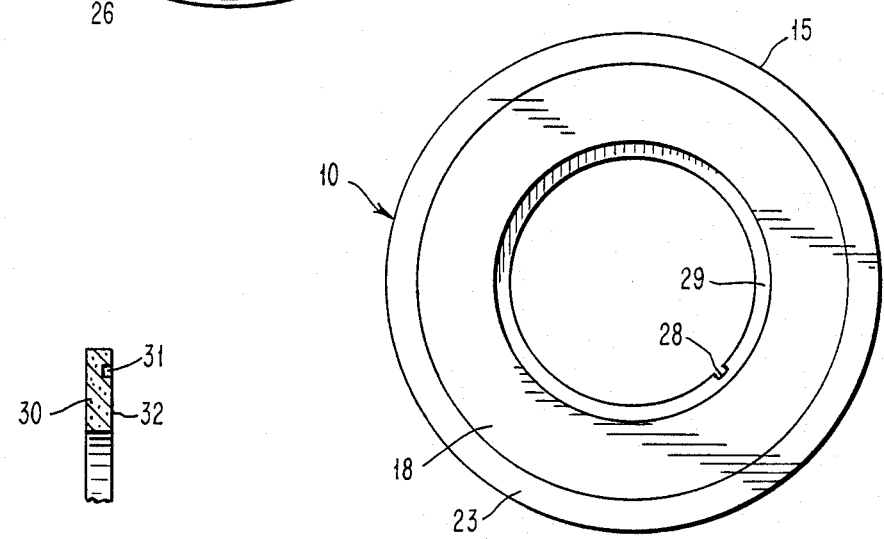
FIG. 3 is a right end view of only the rotary seal of FIG. 1.

FIG. 2 and FIG. 3 are the left and right end views, respectively, of seal 10 when removed from shaft 11 and axle 13. FIG. 2 shows that the base of recess 16 has four equally spaced sockets 26 ready to receive springs 27. The central bore of seal 10 has keyway 28 to receive a key which will lock it on axle 13 to ensure that seal 10 rotates with shaft 11. Concentric plastic washer 23 and bearing washer 18 leave only a narrow band 29 of body 15 visible in FIG. 3. The faces of washers 18,23 are in a plane at least 0.05 inch further out than the face of band 29 so that, when washers 18, 23 are in rubbing, lubricated contact with face plate 14, annular band 29 will not make contact with plate 14.

Figure 4:
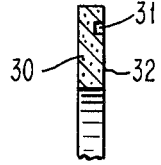
FIG. 4 is a radial section of a modified form of the porous bearing washer of the rotary seal of the invention.

FIG. 4 is a radial section of a porous bearing washer 30 with a circular groove 31 in its exposed face 32 which ordinarily is in contact with a face plate. Groove 31 is near the outer perimeter of washer 30 and helps to collect fine particles particularly where washer 30 is subject to appreciable wear. Washer 30 with groove 31 can replace washer 18 in seal 10 of FIGS. 1,2,3.

Figure 5:
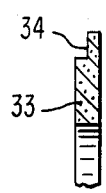
FIG. 5 is a radial section of another modified form of the bearing washer.

FIG. 5 is a radial section of another porous bearing washer 33 which is equivalent to, and can replace, bearing washer 18 and plastic washer 23 in seal 10 of FIGS. 1,2,3 in cases where there is no need to shield bearing washer 18 from direct contact with water or other liquid. The outer perimeter portion 34 of washer 33 is of reduced thickness corresponding to the thickness of plastic washer 23.

Figure 6:
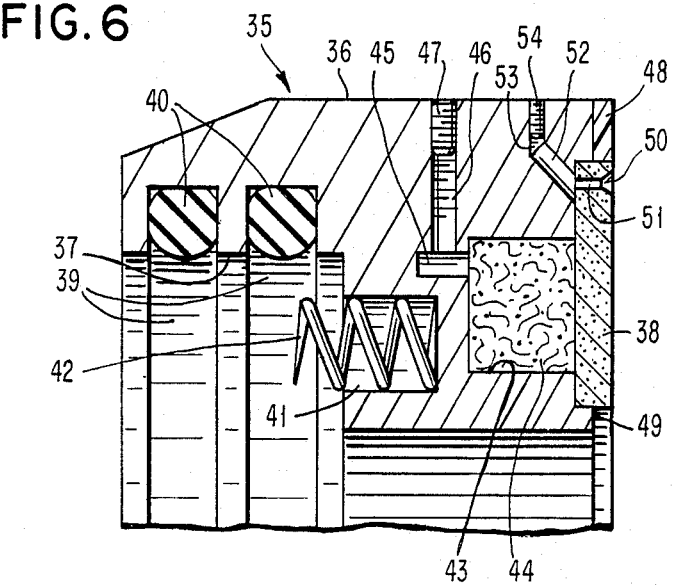
FIG. 6 is a radial section of another preferred embodiment of the rotary seal of the invention.

FIG. 6 is a radial section of another rotary seal 35 having ring-shaped body 36 with concentric cylindrical recess 37 at one end and with porous bearing washer 38 at the other end. The cylindrical surface of recess 37 has two grooves 39 which hold O-rings 40, and the base of recess 37 has several equally spaced sockets 41 holding compression springs 42.

Bearing washer 38 spans circular channel 43 filled with oil-soaked wadding 44. At the bottom of channel 43 is a further small circular channel or groove 45 which acts as an oil reservoir. A radial hole 46 extends from the cylindrical surface of body 36 to groove 45 and thus provides a duct for supplying oil to groove 45 and wadding 44 in channel 43. The outer end of hole 46 is threaded to receive set screw 47 which plugs hole 46 after oil has been introduced. Plastic washer 48 surrounds bearing washer 38. As visually emphasized in FIG. 6, the outer faces of washers 38,48 are in a plane further out than the end 49 of body 36 to ensure that body 36 will not rub the face plate against which washers 38,48 will rotate.

Bearing washer 38 has a circular groove 50 near its outer perimeter as well as hole 51 which communicates with groove 52. Preferably, groove 52 is cut into body 36 at an angle of about 30° to 60° to the axis of body 36 so that the bottom end of groove 52 is farther from the axis than its open end. Thus, when rotary seal 35 is in use on a rotating shaft, as bearing washer 38 slowly wears down and fine particles come off its rubbing face, centrifugal force causes the particles and oil seeping through washer 38 to move radially outward to groove 50 which acts as a trap. The trapped particles and oil then pass from groove 50 through hole 51 into groove 52 which is a sump for the unwanted debris. Because of the angle of groove 52, centrifugal force keeps the debris from flowing back out through hole 51 to groove 50 and the outer face of washer 38. Radial hole 53, similar to hole 46, extends from the cylindrical surface of body 36 to the bottom of groove 52 so that periodically, when threaded plug 54 is removed from hole 53, debris in groove 52 can be drained therefrom.

In a specific example of the rotary seal 10 of FIGS. 1,2,3, a stainless steel body 10 with an outside diameter of 3.5 inches and a bore of 1.625 inches has a circular channel 17 which is 0.43 inch wide and 0.36 inch deep and is filled with oil-soaked cotton wadding 19. Oil-permeable bearing washer 18 formed of sintering bronze powder is cut from Boston Gear's cored bar of Bost-Bronz having inside and outside diameters of 2 and 3 inches, respectively, so that washer 18 measures 0.5 inch in radial width and 0.08 inch in thickness. Washer 18 completely covers circular channel 17 filled with wadding 19. A circular groove 0.06 inch in width and depth is incised in the outer face of bearing washer 18 close to its outer perimeter. Delrin plastic ring 23 is 0.25 inch in radial width and 0.04 inch thick. Recess 16 is 2.38 inches in diameter and 0.43 inch in depth. Six equally-spaced compression springs 27 fit in six sockets 26 of 0.2 inch diameter and 0.4 inch depth. Groove 24 in cylindrical recess 16 holds a rubber O-ring 25. The axial length of steel body 10 is 1.28 inches.

The rotary seal of the example has a bore and cylindrical recess that are each 0.003 to 0.004 inch greater in diameter than the shaft end and shaft shoulder on which the seal is fitted. Also, desirably the annular base of the recess should be spaced slightly, say about 0.03 inch, from the shaft shoulder. The slight diametrical looseness of the seal on the shaft end and shaft shoulder together with the little clearance between the recess base and shaft shoulder give the seal freedom to maintain its lubricated bearing washer in good contact with the face plate in spite of a small deviation from a perfect 90° angle between the face plate and axis of the shaft that may exist. In short, when the shaft rotates, another feature of the seal is its flexibility or movement to accommodate divergence of the shaft axis from perfect normal relation to the face plate.

The compression springs function to keep the oil-permeable bearing washer of the seal in good contact with the face plate even though the seal may be flexing or wobbling relative to the rotating shaft. The number of springs and their individual compression strength should be selected to give the desired pressure of the bearing washer against the face plate. The desired pressure will vary with the use to which the shaft is put. For example, if the rotary shaft is in a vessel maintained at a pressure of 120 pounds per square inch, the seal should be designed so that the chosen number of springs will exert a greater pressure, say 150 pounds per square inch, between the bearing washer and face plate.

Many variations and modifications of the invention will be apparent to those skilled in the art without departing from the spirit or scope of the invention. For instance, the seal of FIG. 6 may have a second radial hole 53 and setscrew 54, preferably in diametrically opposed position to the first, so that when both setscrews 54 are removed not only will oily debris drain from channel 52 more easily but also a flushing liquid may be injected into one hole 53 and discharged through the other. Accordingly, only such limitations should be imposed on the invention as are set forth in the appended claims.

What is claimed is:

1. A lubricated rotary seal for placement between a shoulder of a rotary shaft and a face plate through which the shaft end extends comprising a ring-shaped body to fit said shaft end, a cylindrical recess in one end of said body to overlap said shoulder, a circular groove in the cylindrical surface of said recess and an O-ring in said groove to provide a seal between said body and said shaft, at least three equally-spaced sockets in the annular base of said recess and a compression spring in each of said sockets, a circular channel in the opposite end of said body and a lubricant-porous bearing washer fastened across said channel.

2. The seal of claim 1 wherein a plastic washer surrounds the bearing washer, the outer face of said plastic washer being in the same plane of the outer face of said bearing washer.

3. The seal of claim 1 wherein the circular channel contains oil-soaked wadding.

4. The seal of claim 1 wherein a radial hole through the ring-shaped body communicates with the circular channel and a setscrew is disposed in said hole.

5. The seal of claim 1 wherein the outer face of the bearing washer has a circular groove near the outer perimeter of said bearing washer.

6. The seal of claim 5 wherein a hole in the circular groove of the bearing washer extends through said bearing washer to a cavity in the ring-shaped body.

7. The seal of claim 6 wherein at least one radial hole through the ring-shaped body communicates with the cavity and a setscrew is disposed in said hole.

8. The seal of claim 7 wherein the circular channel contains oil-soaked wadding, a radial hole through the ring-shaped body communicates with said circular channel and a set-screw is disposed in said hole.

9. The seal of claim 1 wherein the lubricant-porous bearing washer is an oil-impregnated sintered bronze.

10. The seal of claim 9 wherein a plastic washer surrounds the bearing washer, the outer face of said plastic washer being in the same plane of the outer face of said bearing washer, and said outer face of said bearing washer has a circular groove near the outer perimeter of said bearing washer.

11. The seal of claim 10 wherein a hole in the circular groove of the bearing washer extends through said bearing washer to a cavity in the ring-shaped body.

12. The seal of claim 11 wherein at least one radial hole through the ring-shaped body communicates with the cavity and a setscrew is disposed in said hole.

* * * * *